US010957195B2

(12) United States Patent
Walker et al.

(10) Patent No.: US 10,957,195 B2
(45) Date of Patent: Mar. 23, 2021

(54) APPARATUSES, SYSTEMS, AND METHODS FOR GRAPHICAL PROGRESS INTERFACES FOR DYNAMIC TRANSPORTATION NETWORKS

(71) Applicant: Lyft, Inc., San Francisco, CA (US)

(72) Inventors: Eliot Landis Wertime Walker, Oakland, CA (US); Christopher John Selin, San Francisco, CA (US); Meghan Newell, San Francisco, CA (US); Seven Shurygin, San Francisco, CA (US)

(73) Assignee: Lyft, Inc., San Francisco, CA (US)

(*) Notice: Subject to any disclaimer, the term of this patent is extended or adjusted under 35 U.S.C. 154(b) by 11 days.

(21) Appl. No.: 16/024,268

(22) Filed: Jun. 29, 2018

(65) Prior Publication Data

US 2020/0005637 A1   Jan. 2, 2020

(51) Int. Cl.
*G08G 1/00* (2006.01)
*G08G 1/0967* (2006.01)
*G06F 3/0481* (2013.01)
*G08G 1/0969* (2006.01)
*G01C 21/36* (2006.01)
*G08G 1/0968* (2006.01)

(52) U.S. Cl.
CPC ..... *G08G 1/096775* (2013.01); *G01C 21/362* (2013.01); *G01C 21/3641* (2013.01); *G06F 3/04817* (2013.01); *G08G 1/0969* (2013.01); *G08G 1/096877* (2013.01)

(58) Field of Classification Search
CPC ....... G08G 1/096775; G08G 1/096877; G08G 1/0969; G01C 21/362; G01C 21/3641; G06F 3/04817

USPC ......................................................... 701/117
See application file for complete search history.

(56) References Cited

U.S. PATENT DOCUMENTS

| 10,119,831 | B2 * | 11/2018 | Moore ................ G08G 1/0962 |
| 2014/0063064 | A1 * | 3/2014 | Seo ........................ G08G 1/166 |
| | | | 345/633 |

(Continued)

OTHER PUBLICATIONS

Ride Systems, www.ride-systems.com, Wayback Machine used for May 2, 2018, Map Image.*

*Primary Examiner* — James M McPherson
*Assistant Examiner* — Tiffany P Ohman
(74) *Attorney, Agent, or Firm* — FisherBroyles LLP

(57) ABSTRACT

The disclosed computer-implemented method may include receiving, by a transportation requestor device, progress information that indicates progress of a transportation provider toward a request location, presenting, via a graphical user interface of the transportation requestor device, the progress of the transportation provider toward the request location with a graphical representation of the transportation provider according to the progress information, receiving, by the transportation requestor device, contextual information from a server that explains the progress of the transportation provider as indicated by the progress information, and changing, via the graphical user interface of the transportation requestor device, the graphical representation of the transportation provider with a graphical representation of the contextual information. Various other methods, systems, and computer-readable media are disclosed.

20 Claims, 9 Drawing Sheets

(56) References Cited

U.S. PATENT DOCUMENTS

| | | | |
|---|---|---|---|
| 2014/0282374 A1* | 9/2014 | Fletcher | G06F 8/43 |
| | | | 717/106 |
| 2015/0369617 A1* | 12/2015 | Ding | G01C 21/34 |
| | | | 701/428 |
| 2018/0088749 A1* | 3/2018 | Yamashita | G06F 3/0482 |
| 2019/0130745 A1* | 5/2019 | Turato | G08G 1/123 |
| 2019/0248278 A1* | 8/2019 | Salter | B60Q 1/34 |

* cited by examiner

APPARATUSES, SYSTEMS, AND METHODS FOR GRAPHICAL PROGRESS INTERFACES FOR DYNAMIC TRANSPORTATION NETWORKS

BACKGROUND

Some transportation services may provide transportation to transportation requestors using transportation providers to meet the needs of those requesting transportation services on an on-demand basis. However, while on-demand transportation services may provide convenience and flexibility to those requesting transportation, some on-demand transportation services may also create confusion, uncertainty, or anxiety while transportation requestors wait for the transportation to arrive due to the lack of sufficient transportation provider travel progress information being provided to transportation requestor devices.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
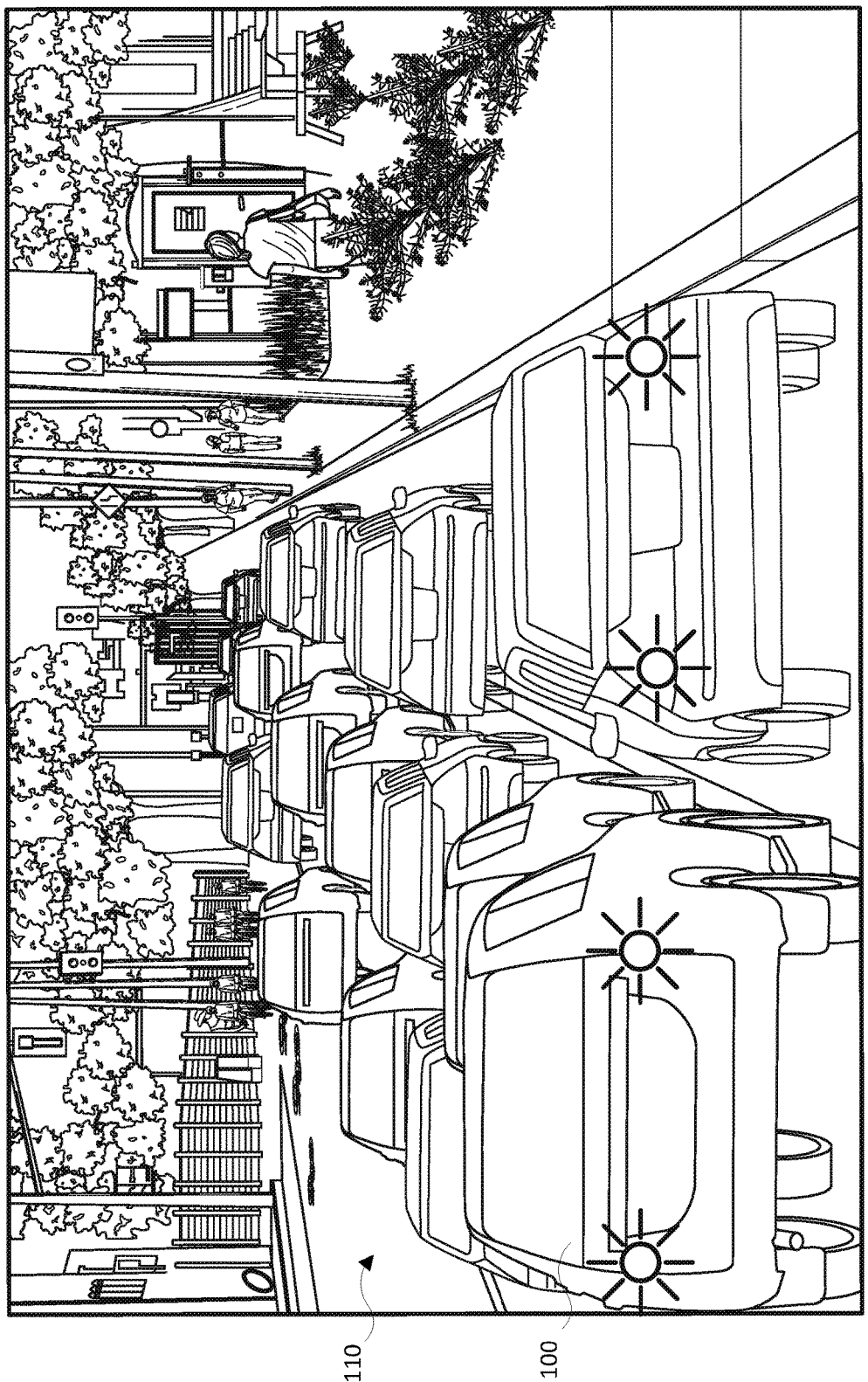
FIG. 1 is an illustration of an example of a transportation provider in a dynamic transportation network making slow travel progress within congested traffic.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to providing progress information and contextual information to transportation requestors matched to transportation providers in dynamic transportation networks. When transportation requestors request a transportation service they may desire information about when the transportation requestor will arrive. Transportation requestors may also desire contextual information that explains the progress the transportation provider is making while traveling to the requestor. If the transportation provider is delayed, the requestor may desire contextual information as to the cause of the delay. In some examples, a method of providing the contextual information is through a graphical user interface on the requestor's smartphone.

Accordingly, as may be appreciated, the systems and methods described herein may improve the functioning of a computer (e.g., a smartphone and/or a server) that implements graphical progress interfaces for dynamic transportation networks. For example, these systems and methods may improve the functioning of the computer by providing an improved graphical interface. Additionally or alternatively, these systems and methods may improve the functioning of the computer by providing progress information in the form of computer-generated graphics. In some examples, these systems and methods may improve the functioning of a computer by reducing repeated travel progress queries from a transportation requestor device (and, e.g., thereby freeing computing resources for other tasks, such as those directly and/or indirectly involved in dynamic transportation matching).

Furthermore, for the reasons mentioned above and to be discussed in greater detail below, the systems and methods described herein may provide advantages to dynamic transportation management, graphical user interfaces, and/or the field of transportation. In addition, these systems and methods may provide advantages to vehicles (whether piloted by a human driver or autonomous) that operate as a part of a dynamic transportation network. For example, the graphical interfaces described herein may reduce user confusion and thereby help to reduce the number of transportation request cancellations. By reducing the number of cancellations, the systems and methods described herein may improve the efficiency of a dynamic transportation network (e.g., reducing otherwise wasted efforts by transportation providers to meet with transportation requestors). For example, the vehicles may complete transportation tasks more quickly, more efficiently (e.g., in terms of fuel, vehicle wear, etc.), and/or more safely (e.g., by driving, on average, shorter distances to complete the same transportation objective).

As described above, a transportation requestor may desire travel progress information of a transportation provider using a graphical user interface (GUI) on an electronic device. A transportation requestor may use an electronic device (e.g., a smartphone, tablet, computer, laptop, virtual assistant device, head mounted display device, etc.) to request the transportation service and/or to monitor travel progress of the transportation provider. In some examples, a transportation requestor may receive travel progress information of the transportation provider using a GUI on an electronic device included in a console of the transportation provider's vehicle. In some examples, a transportation requestor may receive travel progress information of the transportation provider using a GUI on an electronic device of the transportation provider. In some examples, a transportation requestor may receive travel progress information of the transportation provider using a GUI on an electronic device of another transportation requestor. In some examples, a transportation provider may use an electronic device (e.g., a smartphone, telematics device, vehicle interface device, tablet, computer, laptop, virtual assistant device, head mounted display device, etc.) to receive a request for the transportation service and/or to send data relating to the travel progress of the transportation provider.

In some examples, a transportation requestor may use a GUI on the transportation requestor device to view and monitor the travel progress of a transportation provider. The GUI may be a type of user interface that allows a transportation requestor to interact with an electronic device through graphical representations including, without limitation, graphical icons, graphical animations, and visual indicators. The GUI may display, without limitation, a street map, pickup locations, and icons representing vehicles, vehicle conditions, vehicle identification, driver identification, estimated time of arrival (ETA), animations of vehicle progress, traffic conditions, text information, notifications, landmarks, point of interest, and satellite images.

In some examples, a transportation requestor may specify a meeting location at which the transportation provider may meet the transportation requestor in order to pick up the transportation requestor to begin the transportation service. In some examples, the transportation requestor may specify a street address or a landmark as a meeting location. In some examples, the meeting location may be specified as the location of the transportation requestor at the time of the request. The location of the transportation requestor may be determined by a global navigation satellite system receiver (e.g., GPS) and/or multilateration of radio signals between multiple wireless base stations.

In some examples, the GUI may provide icons overlaid on a street map to indicate the transportation provider's travel progress towards the meeting location. In some examples, an icon representing a vehicle may be overlaid on the street map and the location of the vehicle icon may be shown at a location on the map corresponding to the location of the transportation provider sent by the transportation provider device. The GUI may also show the vehicle icon moving on the map with a motion corresponding to periodic updates of the location of the transportation provider sent by the transportation provider device.

In some examples, the transportation requestor device may receive contextual information that explains the travel progress of the transportation provider. The contextual information may explain conditions related to the travel progress of the transportation provider including, without limitation, the speed of travel of the transportation provider, the traffic conditions within which the transportation provider is traveling, braking conditions, and the condition of progress information sent by the transportation provider. When a transportation requestor is monitoring the travel progress of a matched transportation provider, the requestor may be viewing the movement of an icon representing a vehicle of the transportation requestor on a GUI of the requestor's electronic device. The vehicle icon may be overlaid on a street map showing a route of travel of the transportation provider to a meeting place with the requestor. The GUI may show the vehicle icon moving on the map as the vehicle progresses. The GUI may use progress information from the transportation provider in order to show the travel progress on the map. The progress information may be limited to information related to the location and bearing of the transportation provider. In some examples, the progress information may include location and/or bearing information periodically sent from the transportation provider to the transportation requestor's device. If the transportation requestor stops receiving the progress information, for reasons described in more detail below, the GUI may stop showing the movement of the vehicle on the map. The transportation requestor may believe the vehicle has stopped moving and is no longer making progress towards the requestor, thereby causing anxiety for the requestor. In some examples, the vehicle may actually continue to make progress towards the requestor but the GUI may have stopped showing the progress. An electronic device (e.g., a server) may detect the lack of progress information being sent to the requestor and may send contextual information to the requestor to explain the progress of the transportation provider. In some examples, the electronic device (e.g., server) may detect a lack of all progress information or a lack of a portion of the progress information. The contextual information may relieve the anxiety of the requestor by explaining the progress of the transportation provider in an animation of the travel progress on the GUI. The contextual information may use various sources of data (described in more detail below) to predict the location and travel progress of the transportation provider in order to generate the animation. The animation of the travel progress may show a vehicle icon representing the transportation provider moving on the map by using the contextual information in a fashion similar to showing the travel progress using a vehicle icon moving on the map using the progress information.

In some examples, the transportation requestor may receive progress information including position and bearing from the transportation provider while the provider is making diminished or slow progress towards the meeting location. The slow progress indicated by the progress information may cause anxiety for the requestor who may desire contextual information to explain the cause of the slow progress. In some examples, a transportation provider may make slow progress due to traffic congestion, traffic lights, and/or road construction. In some examples, the contextual information may be presented to the transportation requestor in the GUI by showing illuminated brake lights on the vehicle icon to indicate the slow travel progress.

In some examples, the GUI may enhance the graphical representation of the transportation provider's progress with a graphical representation of the contextual information. The GUI may enhance the graphical representation of the transportation provider's progress by displaying an icon representing contextual information differently from displaying an icon representing progress information. The GUI may display a graphical representation of the contextual information by various methods including, without limitation, enhancing the display of a vehicle icon as opaque, blurred, cloudy, darkened, shadowed, or dimmed. In some examples, the GUI may display a graphical representation of the contextual information by enhancing the display of various components of the vehicle icon including, without limitation, brake lights, turn signals, head lights, vehicle sensors, vehicle actuators, and dash cam images. In some examples, the GUI may display a graphical representation of contextual information that indicates the driving conditions of the transportation provider. When a transportation provider is traveling slowly and/or is applying the brakes, the graphical representation may be displayed as a vehicle icon with illuminated brake lights. When a transportation provider is signaling to turn, the graphical representation may be displayed as a vehicle icon with a turn signal activated indicating the direction of the turn. The information indicating the transportation provider is signaling to turn may be provided from the transportation provider's vehicle and/or images collected from outside the vehicle. In some examples, when a transportation provider is in congested traffic, the graphical representation may be displayed as a vehicle icon showing dash cam images from the transportation provider. In some examples, the GUI may enhance the graphical representation of the transportation provider's progress with a graphical representation of the contextual information when the progress of the transportation provider differs from the requestor's expectations of the travel progress. For example, if the GUI is showing the requestor a vehicle icon traveling on an expected route towards the meeting location, and the transportation provider has initiated a turn that deviates from the expected route, the GUI may then show contextual information such as a turn signal.

The progress information may function to provide information on the travel progress and/or status of a transportation provider to a meeting place with a transportation requestor. In some examples, the progress information may include, without limitation, information relating to a transportation provider's location, bearing, speed, acceleration, travel route, direction, cornering, video and/or audio collected from in-vehicle sensors, traffic conditions near the transportation provider, road conditions, and weather conditions.

In some examples, the contextual information may function to provide information which explains the travel progress or status of a transportation provider to a transportation requestor. The contextual information may be generated from data which is acquired, simulated, computed, estimated, or a combination thereof. The contextual information may include, without limitation, a transportation provider's position, speed, acceleration, travel route, bearing, direction, and vehicle conditions (e.g., braking, cornering, etc.). The contextual information may from generated from data various sources including, without limitation, a transportation provider's device, a transportation provider's vehicle, a nearby transportation provider's device, a nearby transportation provider's vehicle, and traffic-sensing infrastructure (e.g., electronic toll collection system, road transponders, etc.).

Any of a variety of conditions may trigger the use of contextual information to enhance the graphical representation of the transportation provider's progress within the GUI. In some examples, a transportation provider may experience reduced travel progress due to traffic congestion, weather conditions, or road construction. Displaying of contextual information may be triggered when the travel progress is reduced or when the speed of the transportation provider falls below a threshold. The speed threshold may be variable and may be set as an absolute value or set as a value relative to the speed limit on the road section being traveled by the transportation provider. The progress information manager (described in more detail below) may compare the threshold to an average speed of the transportation provider or an instantaneous speed.

As described above, the transportation provider may send progress information and/or contextual information to the transportation requestor's device. The progress information may be sent over a communication link from the transportation provider to the transportation requestor's device. The progress information may be sent through various network nodes (e.g., packet gateways, back-end servers) before being received by the transportation requestor. The communication link may function to transmit and receive data and/or information relating to progress information and contextual information. The communication link may be wireless and include cellular communication which uses at least one of Long Term Evolution (LTE), Long Term Evolution-Advanced (LTE-A), Code Division Multiple Access (CDMA), Wideband Code Division Multiple Access (WCDMA), Universal Mobile Telecommunication System (UMTS), Wireless Broadband (WiBro), or Global System for Mobile Communication (GSM), Wireless Fidelity (Wi-Fi), Bluetooth, Bluetooth Low Power (BLE), Zigbee, Vehicle to Vehicle (V2V), or Near Field Communication (NFC). In some examples, the progress information may not be received by the transportation requestor. The progress information may not be received by the transportation requestor due to various causes including, without limitation, a failure of the communication link, the transportation provider not being able to send the progress information, or the transportation provider not being able to obtain the progress information (e.g., loss of GPS signal).

In some examples, when a transportation requestor is unable to receive progress information, the transportation requestor may receive contextual information in order to monitor the transportation provider's progress. The GUI may represent the contextual information as an animation of the travel progress of the transportation provider. In some examples, the transportation provider may monitor the progress of a transportation provider based on progress information and represented in the GUI as a first icon, stop receiving the progress information, begin receiving contextual information and switch to monitoring the progress of a transportation provider based on the contextual information represented in the GUI as a second icon, which is represented different from the first icon.

In some examples, the contextual information may include information that simulates and/or emulates the actual travel progress of the transportation provider. The contextual information that simulates the actual travel progress of the transportation provider may be computed based on various sources of data including, without limitation, road speed limit data, navigation route data, historical transportation provider data, other nearby transportation provider data, crowd sourced data, road sensor data, and toll collection system (e.g., EZ pass) data.

In some examples, the contextual information may function to provide information on a pickup location for the transportation requestor. When a transportation requestor sends a location for a transportation request pickup, the transportation requestor may receive contextual information which shows a nearby location as the pickup location. In some examples, the nearby location may be a location that complies with local traffic laws or increases the safety and/or convenience of the pickup for the transportation requestor and/or the transportation provider. Adjusting the pickup to a nearby location may avoid pickups in areas including, without limitation, bus stops, bicycle lanes, and no standing zones.

FIG. 1 is an illustration of an example of a transportation provider in a dynamic transportation network making slow travel progress within congested traffic. As shown in FIG. 1, transportation provider 100 may travel to a meeting location with a transportation requestor. Transportation provider 100 may travel at varying speeds to the meeting location. Along the route to the meeting location transportation provider 100 may experience congested traffic condition 110 in which congested traffic condition 110 causes a reduction in the speed of the transportation provider and a delay in arriving at the meeting location. A transportation requestor may monitor the travel progress of transportation provider 100 when the transportation provider experiences a delay. The transportation provider may desire contextual information relating to the existence of a delay and the cause of the delay.

Figure 2:
FIG. 2 illustrates a transportation provider device and a transportation requestor device receiving progress information.

FIG. 2 illustrates examples of a transportation provider device 200 and a transportation requestor device 210 receiving progress information. As shown in FIG. 2, transportation provider device 200 may include a GUI, which may include street map 220 indicating the streets surrounding the transportation provider. The GUI may include vehicle icon 240 representing the transportation provider overlaid on street map 220. A meeting location with the transportation requestor may be indicated by text field 230. Transportation requestor device 210 may include a GUI which may include street map 250 indicating the streets surrounding the transportation provider. The GUI may include vehicle icon 260 representing the transportation provider overlaid on street map 250. The GUI on transportation provider device 200 may update the location of vehicle icon 240 overlaid on the map as the location of the transportation provider changes due to travel progress towards the meeting location with the transportation requestor. The GUI on transportation requestor device 210 may update the location of vehicle icon 260 overlaid on the map as the location of the transportation provider changes due to travel progress towards a meeting location with the transportation requestor. The location of vehicle icon 260 overlaid on map 250 may be based on the progress information received by transportation requestor device 210.

Figure 3:
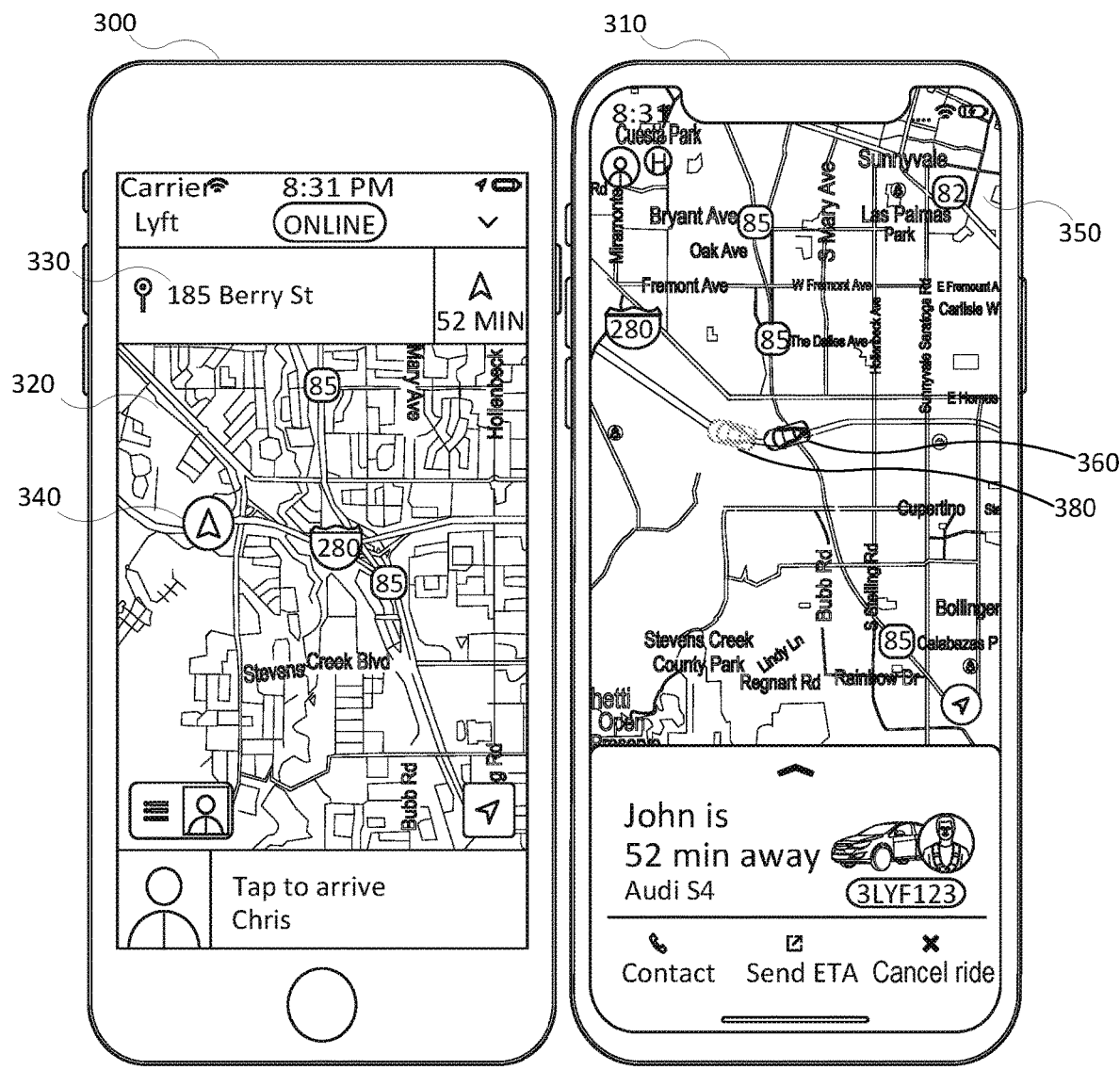
FIG. 3 illustrates a transportation provider device and a transportation requestor device receiving contextual information about a transportation provider's travel progress.

FIG. 3 illustrates transportation provider device 300 and transportation requestor device 310 receiving contextual information about a provider's travel progress. As shown in FIG. 3, transportation provider device 300 may include a GUI which may include street map 320 indicating the streets surrounding the transportation provider. The GUI may include vehicle icon 340 representing the transportation provider overlaid on street map 320. A meeting location with the transportation requestor may be indicated by text field 330. In some examples, transportation requestor device 310 may no longer receive progress information relating to the travel progress of a transportation provider as described above. Transportation requestor device 310 may include a GUI which may include street map 350 indicating the streets surrounding the transportation provider. The GUI may include a first vehicle icon 360 representing the location of the transportation provider overlaid on street map 350 before transportation requestor device 310 was not able to receive progress information. The GUI on the transportation requestor device 310 may update the location of the transportation provider based on contextual information received by the transportation provider device 310. The GUI may enhance the graphical representation of the transportation provider with second vehicle icon 380, which is different from first vehicle icon 360.

Figure 4:
FIG. 4 illustrates a transportation provider device and a transportation requestor device displaying an animation associated with contextual information about a transportation provider's travel progress.

FIG. 4 illustrates transportation provider device 400 and transportation requestor device 410 displaying an animation associated with contextual information about a transportation provider's travel progress. As shown in FIG. 4 and described above with respect to FIG. 3, transportation requestor device 410 may no longer receive progress information relating to the travel progress of a transportation provider. Transportation provider device 400 may include a GUI which may include street map 420 indicating the streets surrounding the transportation provider. The GUI may include vehicle icon 440 representing the transportation provider overlaid on street map 420. A meeting location with the transportation requestor may be indicated by text field 430. Transportation requestor device 410 may include a GUI which may include street map 450 indicating the streets surrounding the transportation provider. The GUI may include a first vehicle icon 460 representing the location of the transportation provider overlaid on street map 450 before transportation requestor device 410 was not able to receive progress information. The GUI on the transportation requestor device 410 may animate the location of the transportation provider based on contextual information received by the transportation provider device 410. FIG. 4 differs from FIG. 3 in that the contextual information may include an updated prediction of the location of the transportation provider. FIG. 4 also shows the animation may periodically update the location of the transportation provider on the map 450 using an enhanced graphical representation of the transportation provider. The enhanced graphical representation of the transportation provider may be second vehicle icon 480, which is different from first vehicle icon 460.

Figure 5:
FIG. 5 illustrates a transportation provider device and a transportation requestor device displaying contextual information about a transportation provider's slow travel progress.

FIG. 5 illustrates transportation provider device 500 and transportation requestor device 510 displaying contextual information about a provider's slow travel progress. As shown in FIG. 5, transportation provider device 500 may include a GUI, which may include street map 520 indicating the streets surrounding the transportation provider. The GUI may include vehicle icon 540 representing the transportation provider overlaid on street map 520. The meeting location with the transportation requestor may be indicated by text field 530. Transportation requestor device 510 may include a GUI which may include street map 550 indicating the streets surrounding the transportation provider. The GUI may include enhanced vehicle icon 590 representing the transportation provider overlaid on street map 550. The GUI on transportation provider device 500 may update the location of vehicle icon 540 overlaid on the map as the location of the transportation provider changes due to travel progress towards a meeting location with the transportation requestor. The GUI on transportation requestor device 510 may enhance the graphical representation of the transportation provider by enhancing enhanced vehicle icon 590 based on contextual information. In some examples, when the contextual information indicates the transportation provider's travel progress has slowed, enhanced vehicle icon 590 may be shown with illuminated brake lights 595.

Figure 6:
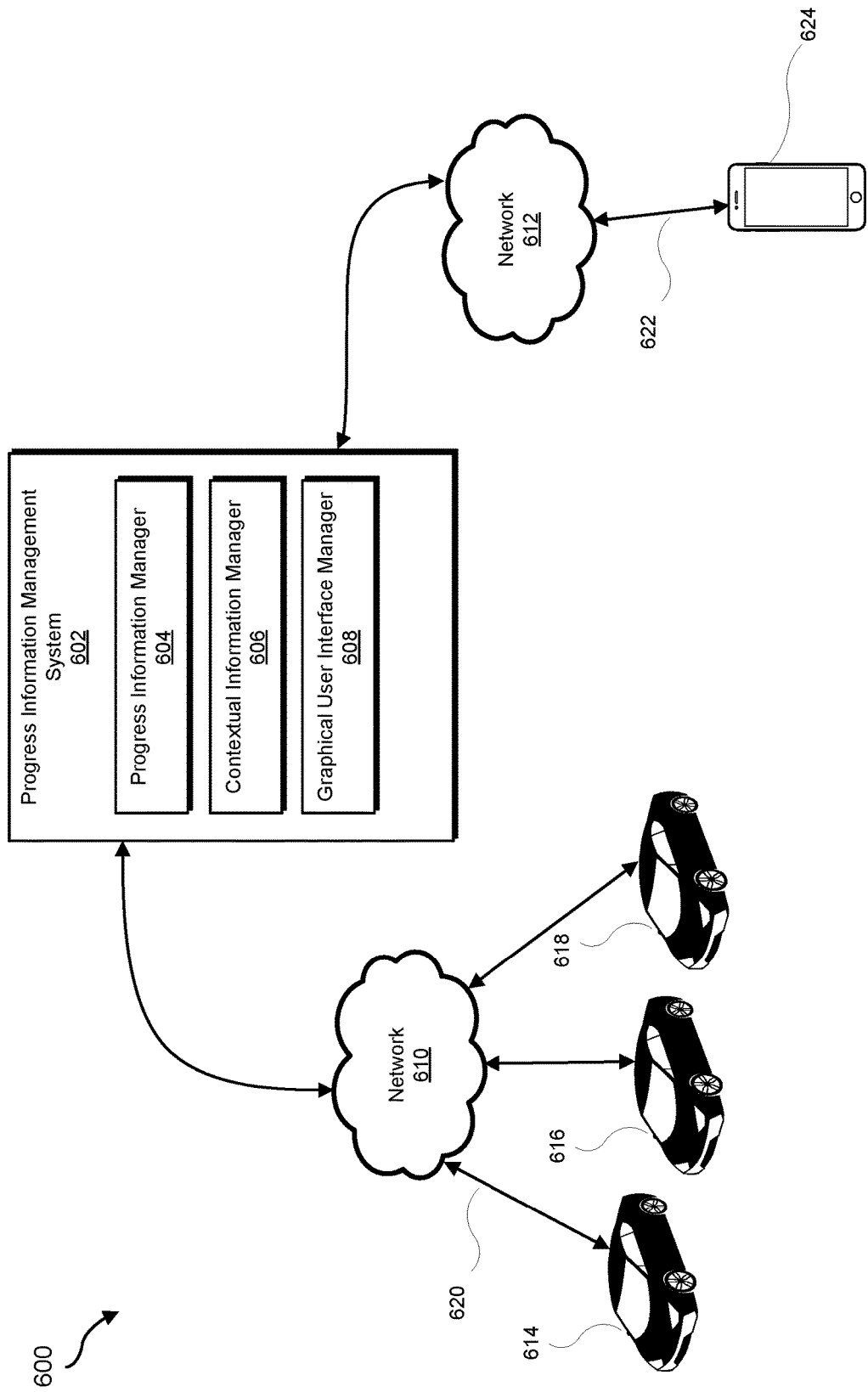
FIG. 6 is a block diagram of an example system for providing progress information and contextual information to a graphical user interface in a transportation requestor's device.
Figure 7:
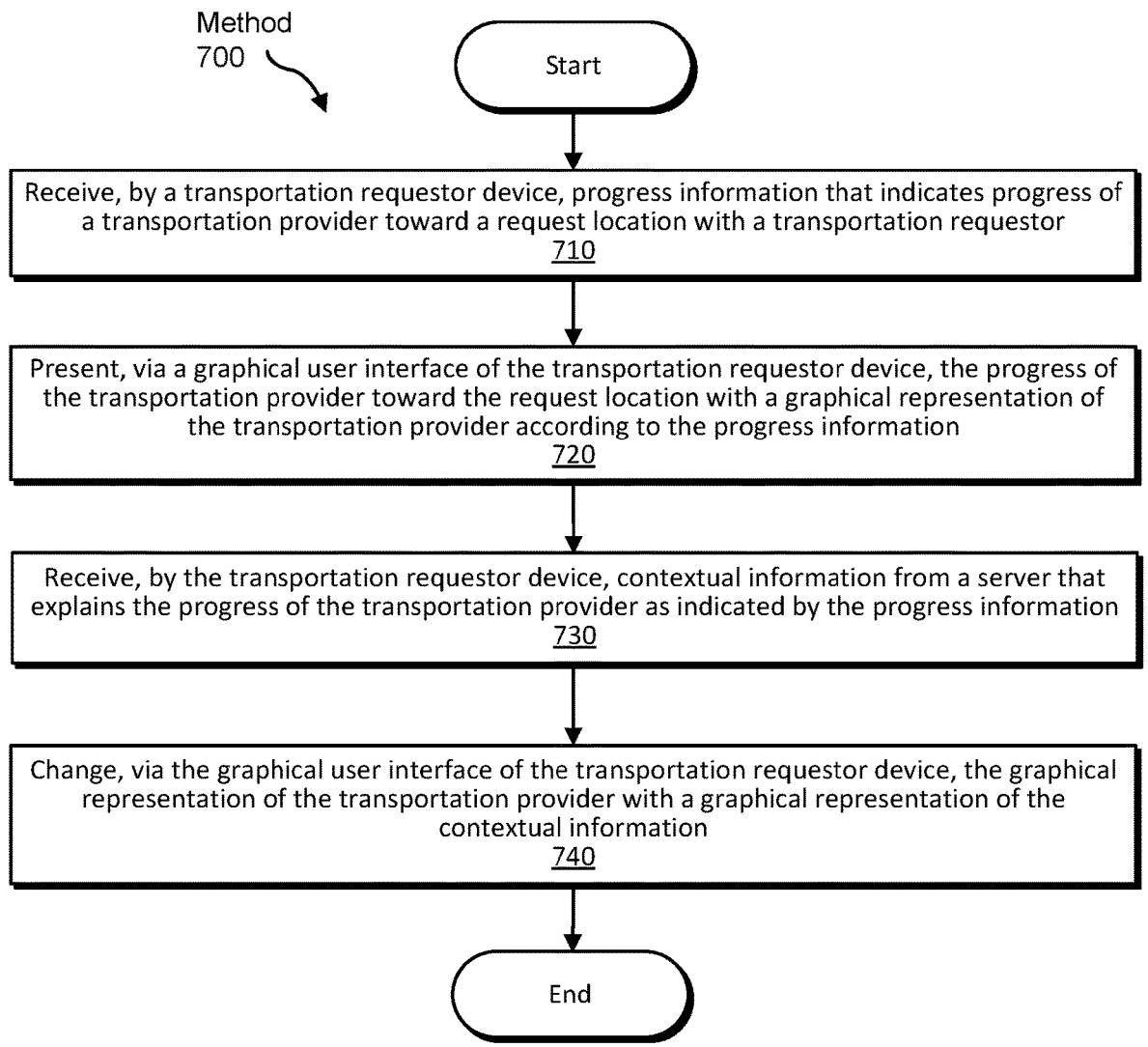
FIG. 7 is a flow diagram of an example method for enhancing a graphical user interface of a transportation requestor device with a graphical representation of contextual information associated with a transportation provider's travel progress.

FIG. 6 is a block diagram of an of an example system for providing progress information and contextual information to a graphical user interface in a transportation requestor's device. As shown in FIG. 6, system 600 may include progress information management system 602 configured with progress information manager 604, contextual information manager 606, and graphical user interface manager 608. System 600 may include network 610, network 612, transportation providers 614, 616, 618, transportation requestor device 624, and communication links 620, 622. In some examples, transportation providers 614, 616, and 618 may provide transportation services to transportation requestors in a dynamic transportation network. Transportation providers 614, 616, and 618 may send progress information relating to the location and/or conditions of transportation providers 614, 616, and 618 respectively through network 610 to progress information manager 604. Transportation requestor device 624 may receive progress information and contextual information through network 612 over communication link 622. In some examples, transportation provider 614 may be matched to a transportation requestor which uses transportation requestor device 624. Transportation provider 614 may provide progress information over communication link 620 to progress information manager 604. Contextual information manager 606 may generate contextual information based on various sources of information including, without limitation, information from progress information manager 604. Graphical user interface manager 608 may enhance the graphical representation of the contextual information and provide the enhanced graphical representation through network 612 over communication link 622 to transportation requestor device 624. Contextual information manager 606 may generate contextual information based on the conditions described above including the loss of communication over communication links 620 and/or 622. In some examples, progress information management system 602 may be implemented by a server, a computer, a smart phone, a vehicle, or a combination thereof. In some examples, certain contextual information elements may be generated in a server and certain other contextual information elements may be generated in transportation requestor device 624. In some examples, a contextual information manager 606 may receive and/or generate data (e.g., speed limit data, weather data, traffic condition data) related to an estimated location of a matched transportation provider and provide the generated data to transportation requestor device 624. Transportation requestor device 624 may then generate the estimated location based on the data provided by the server. In some examples, transportation requestor device 624 may also overlay the estimated location of the matched transportation provider on a map. In some examples, transportation requestor device 624 may implement certain functions of graphical user interface manager 608. Transportation requestor device 624 may receive contextual information from a server, generate contextual information from data received from a server, or a combination thereof, and generate graphics and/or enhanced graphics for displaying on transportation requestor device 624. FIG. 7 is a flow diagram of an example method 700 for enhancing a graphical user interface of a transportation requestor device with a graphical representation of contextual information associated with a transportation provider's travel progress. As shown in FIG. 7, the method may include, at step 710, receiving, by a transportation requestor device, progress information that indicates progress of a transportation provider toward a request location. At step 720, the method may include presenting, via a graphical user interface of the transportation requestor device, the progress of the transportation provider toward the request location with a graphical representation of the transportation provider according to the progress information. At step 730, the method may include receiving, by the transportation requestor device, contextual information from a server that explains the progress of the transportation provider as indicated by the progress information. At step 740, the method may include changing, via the graphical user interface of the transportation requestor device, the graphical representation of the transportation provider with a graphical representation of the contextual information.

In one example, a computer-implemented method may include receiving, by a transportation requestor device, progress information that indicates progress of a transportation provider toward a request location. In some examples, the method may further include presenting, via a graphical user interface of the transportation requestor device, the progress of the transportation provider toward the request location with a graphical representation of the transportation provider according to the progress information. In some examples, the method may further include receiving, by the transportation requestor device, contextual information from a server that explains the progress of the transportation provider as indicated by the progress information. In some examples, the method may further include changing, via the graphical user interface of the transportation requestor device, the graphical representation of the transportation provider with a graphical representation of the contextual information.

In some examples, the contextual information may explain a diminished progress of the transportation provider.

In some examples, the graphical representation of the transportation provider may be a first icon displayed within the graphical user interface of the transportation requestor device. In some examples, the graphical representation of the contextual information may be a second icon displayed within the graphical user interface of the transportation requestor device, and the first icon may be different from the second icon.

In some examples, the graphical representation of the contextual information may be displayed within the graphical user interface of the transportation requestor device as an icon representing a vehicle with illuminated brake lights.

In some examples, the contextual information may include traffic congestion near the transportation provider.

In some examples, the method may further include sending, by the transportation provider to the transportation requestor device, the progress information over a communication link on a periodic basis. In some examples, the method may further include determining that the progress information is not received by the server. In some examples, the method may further include determining that the progress information is not received by the transportation requestor device. In some examples, the method may further include presenting, via a graphical user interface of the transportation requestor device, a graphical representation that indicates that the progress information is not received by the transportation requestor device.

In some examples, the graphical representation of the contextual information may be displayed within the graphical user interface of the transportation requestor device when the speed of the transportation provider is less than a threshold.

In some examples, when the progress information is not received by the server, the graphical representation of the contextual information may include an animation of an expected progress of the transportation provider toward the request location.

In some examples, determining that the progress information is not received by the server may be based on the progress information not being received for a period of time that exceeds a threshold.

In some examples, the contextual information may include information based on not receiving progress information from the transportation provider.

In some examples, the contextual information may be based on traffic conditions of roads associated with a route between the transportation provider and the request location. In some examples, the traffic conditions may be generated by at least one of real-time traffic data and historical traffic data.

In one example, a system may include one or more physical processors and one or more memories coupled to one or more of the physical processors, the one or more memories may include instructions operable when executed by the one or more physical processors to cause the system to perform operations including determining a level of availability of transportation providers in a dynamic transportation network to fulfill transportation requests. In some examples, the operations may further include receiving, by a transportation requestor device, progress information that indicates progress of a transportation provider toward a request location with a transportation requestor. In some examples, the operations may further include presenting, via a graphical user interface of the transportation requestor device, the progress of the transportation provider toward the request location with a graphical representation of the transportation provider according to the progress information. In some examples, the operations may further include receiving, by the transportation requestor device, contextual information from a server that explains the progress of the transportation provider as indicated by the progress information. In some examples, the operations may further include changing, via the graphical user interface of the transportation requestor device, the graphical representation of the transportation provider with a graphical representation of the contextual information.

In some examples, the contextual information may explain a diminished progress of the transportation provider.

In some examples, the graphical representation of the transportation provider may be a first icon displayed within the graphical user interface of the transportation requestor device. In some examples, the graphical representation of the contextual information may be a second icon displayed within the graphical user interface of the transportation requestor device, and the first icon may be different from the second icon.

In some examples, the graphical representation of the contextual information may be displayed within the graphical user interface of the transportation requestor device as an icon representing a vehicle with illuminated brake lights.

In some examples, the contextual information may include traffic congestion near the transportation provider.

In some examples, the operations may further include sending, by the transportation provider to the transportation requestor device, the progress information over a communication link on a periodic basis. In some examples, the operations may further include determining that the progress information is not received by the server. In some examples, the method may further include determining that the progress information is not received by the transportation requestor device. In some examples, the method may further include presenting, via a graphical user interface of the transportation requestor device, a graphical representation that indicates that the progress information is not received by the transportation requestor device.

In some examples, the graphical representation of the contextual information may be displayed within the graphical user interface of the transportation requestor device when the speed of the transportation provider is less than a threshold.

In some examples, when the progress information is not received by the server, the graphical representation of the contextual information may include an animation of an expected progress of the transportation provider toward the request location.

In one example, a non-transitory computer-readable storage medium may include computer-readable instructions that, when executed by at least one processor of a computing device, cause the computing device to receive, by a transportation requestor device, progress information that indicates progress of a transportation provider toward a request location. In some examples, the instructions may further cause the computing device to present, via a graphical user interface of the transportation requestor device, the progress of the transportation provider toward the request location with a graphical representation of the transportation provider according to the progress information. In some examples, the instructions may further cause the computing device to receive, by the transportation requestor device, contextual information from a server that explains the progress of the transportation provider as indicated by the progress information. In some examples, the instructions may further cause the computing device to enhance, via the graphical user interface of the transportation requestor device, the graphical representation of the transportation provider with a graphical representation of the contextual information.

In some examples, presenting progress information and contextual information about a transportation provider's travel progress towards a meeting request location with a transportation requestor may increase a satisfaction level of the transportation requestor about the transportation service.

Embodiments of the instant disclosure may include or be implemented in conjunction with a dynamic transportation matching system. A transportation matching system may arrange rides on an on-demand and/or ad-hoc basis by, e.g., matching one or more ride requestors with one or more ride providers. For example, a transportation matching system may provide one or more transportation matching services for a ridesharing service, a ridesourcing service, a taxicab service, a car-booking service, an autonomous vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a server computer system, or any other hardware platform capable of providing transportation matching services to one or more requestors and/or providers.

Figure 8:
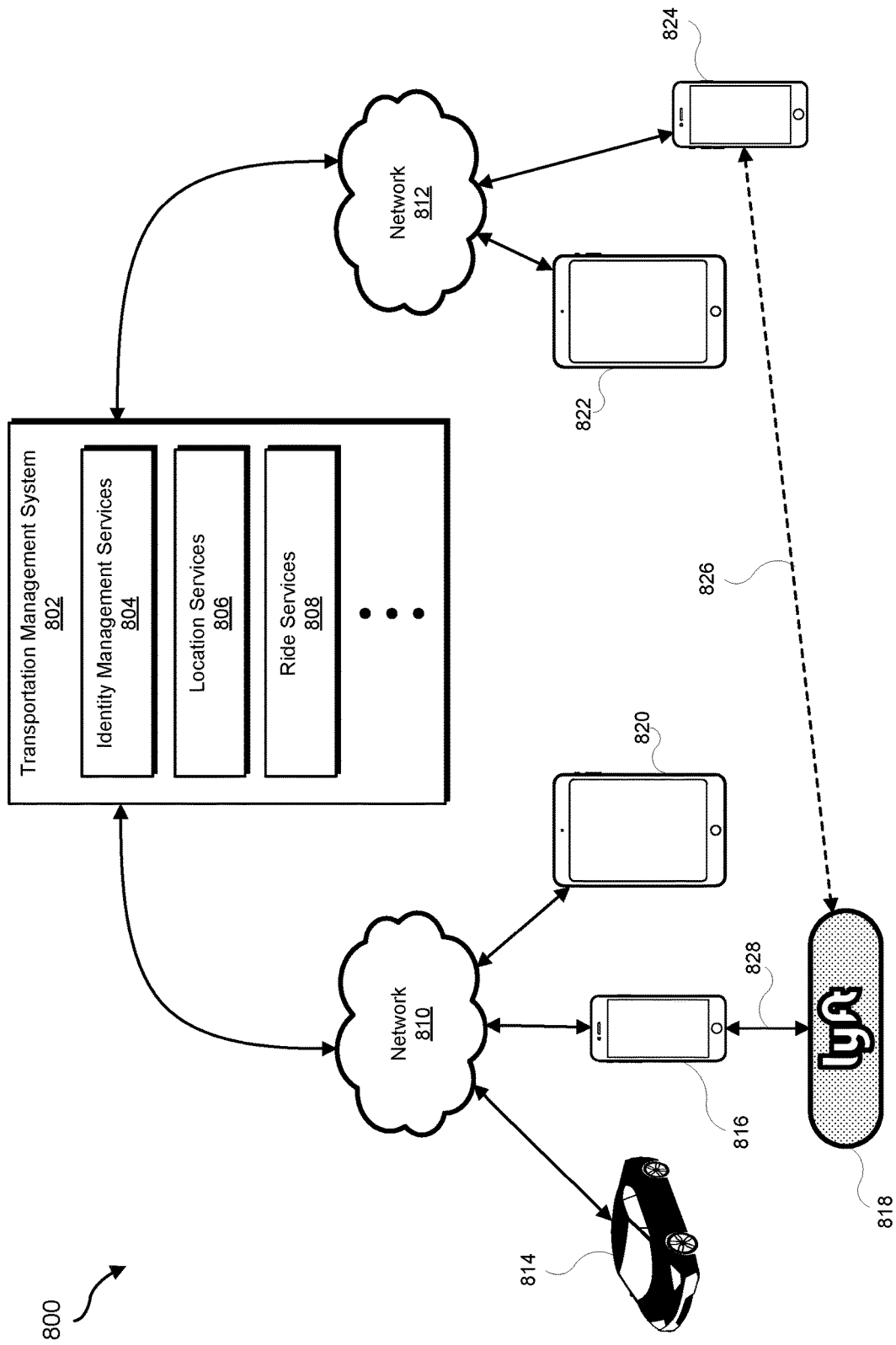
FIG. 8 is an illustration of an example transportation requestor/transportation provider management environment.

FIG. 8 shows a transportation management environment 800, in accordance with various embodiments. As shown in FIG. 8, a transportation management system 802 may run one or more services and/or software applications, including identity management services 804, location services 806, ride services 808, and/or other services. Although FIG. 8 shows a certain number of services provided by transportation management system 802, more or fewer services may be provided in various implementations. In addition, although FIG. 8 shows these services as being provided by transportation management system 802, all or a portion of any of the services may be processed in a distributed fashion. For example, computations associated with a service task may be performed by a combination of transportation management system 802 (including any number of servers, databases, etc.), one or more devices associated with a provider (e.g., devices integrated with managed vehicles 814, provider's computing devices 816 and tablets 820, and transportation management vehicle devices 818), and/or more or more devices associated with a ride requestor (e.g., the requestor's computing devices 824 and tablets 822). In some embodiments, transportation management system 802 may include one or more general purpose computers, server computers, clustered computing systems, cloud-based computing systems, and/or any other computing systems or arrangements of computing systems. Transportation management system 802 may be configured to run any or all of the services and/or software components described herein. In some embodiments, the transportation management system 802 may include an appropriate operating system and/or various server applications, such as web servers capable of handling hypertext transport protocol (HTTP) requests, file transfer protocol (FTP) servers, database servers, etc.

In some embodiments, identity management services 804 may be configured to perform authorization services for requestors and providers and/or manage their interactions and/or data with transportation management system 802. This may include, e.g., authenticating the identity of providers and determining that they are authorized to provide services through transportation management system 802. Similarly, requestors' identities may be authenticated to determine whether they are authorized to receive the requested services through transportation management system 802. Identity management services 804 may also manage and/or control access to provider and/or requestor data maintained by transportation management system 802, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 802 may also manage and/or control access to provider and/or requestor data stored with and/or obtained from third-party systems. For example, a requester or provider may grant transportation management system 802 access to a third-party email, calendar, or task management system (e.g., via the user's credentials). As another example, a requestor or provider may grant, through a mobile device (e.g., 816, 820, 822, or 824), a transportation application associated with transportation management system 802 access to data provided by other applications installed on the mobile device. In some examples, such data may be processed on the client and/or uploaded to transportation management system 802 for processing.

In some embodiments, transportation management system 802 may provide ride services 808, which may include ride matching and/or management services to connect a requestor to a provider. For example, after identity management services module 804 has authenticated the identity a ride requestor, ride services module 808 may attempt to match the requestor with one or more ride providers. In some embodiments, ride services module 808 may identify an appropriate provider using location data obtained from location services module 806. Ride services module 808 may use the location data to identify providers who are geographically close to the requestor (e.g., within a certain threshold distance or travel time) and/or who are otherwise a good match with the requestor. Ride services module 808 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 808 may use rule-based algorithms and/or machine-learning models for matching requestors and providers.

Transportation management system 802 may communicatively connect to various devices through networks 810 and/or 812. Networks 810 and 812 may include any combination of interconnected networks configured to send and/or receive data communications using various communication protocols and transmission technologies. In some embodiments, networks 810 and/or 812 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 810 and/or 812 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 810 and/or 812 may include any combination of networks described herein or any other type of network capable of facilitating communication across networks 810 and/or 812.

In some embodiments, transportation management vehicle device 818 may include a provider communication device configured to communicate with users, such as drivers, passengers, pedestrians, and/or other users. In some embodiments, transportation management vehicle device 818 may communicate directly with transportation management system 802 or through another provider computing device, such as provider computing device 816. In some embodiments, a requestor computing device (e.g., device 824) may communicate via a connection 826 directly with transportation management vehicle device 818 via a communication channel and/or connection, such as a peer-to-peer connection, Bluetooth connection, NFC connection, ad hoc wireless network, and/or any other communication channel or connection. Although FIG. 8 shows particular devices communicating with transportation management system 802 over networks 810 and 812, in various embodiments, transportation management system 802 may expose an interface, such as an application programming interface (API) or service provider interface (SPI) to enable various third parties which may serve as an intermediary between end users and transportation management system 802.

In some embodiments, devices within a vehicle may be interconnected. For example, any combination of the following may be communicatively connected: vehicle 814, provider computing device 816, provider tablet 820, transportation management vehicle device 818, requestor computing device 824, requestor tablet 822, and any other device (e.g., smart watch, smart tags, etc.). For example, transportation management vehicle device 818 may be communicatively connected to provider computing device 816 and/or requestor computing device 824. Transportation management vehicle device 818 may establish communicative connections, such as connections 826 and 828, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 802 using applications executing on their respective computing devices (e.g., 816, 818, 820, and/or a computing device integrated within vehicle 814), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 814 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 802. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 9:
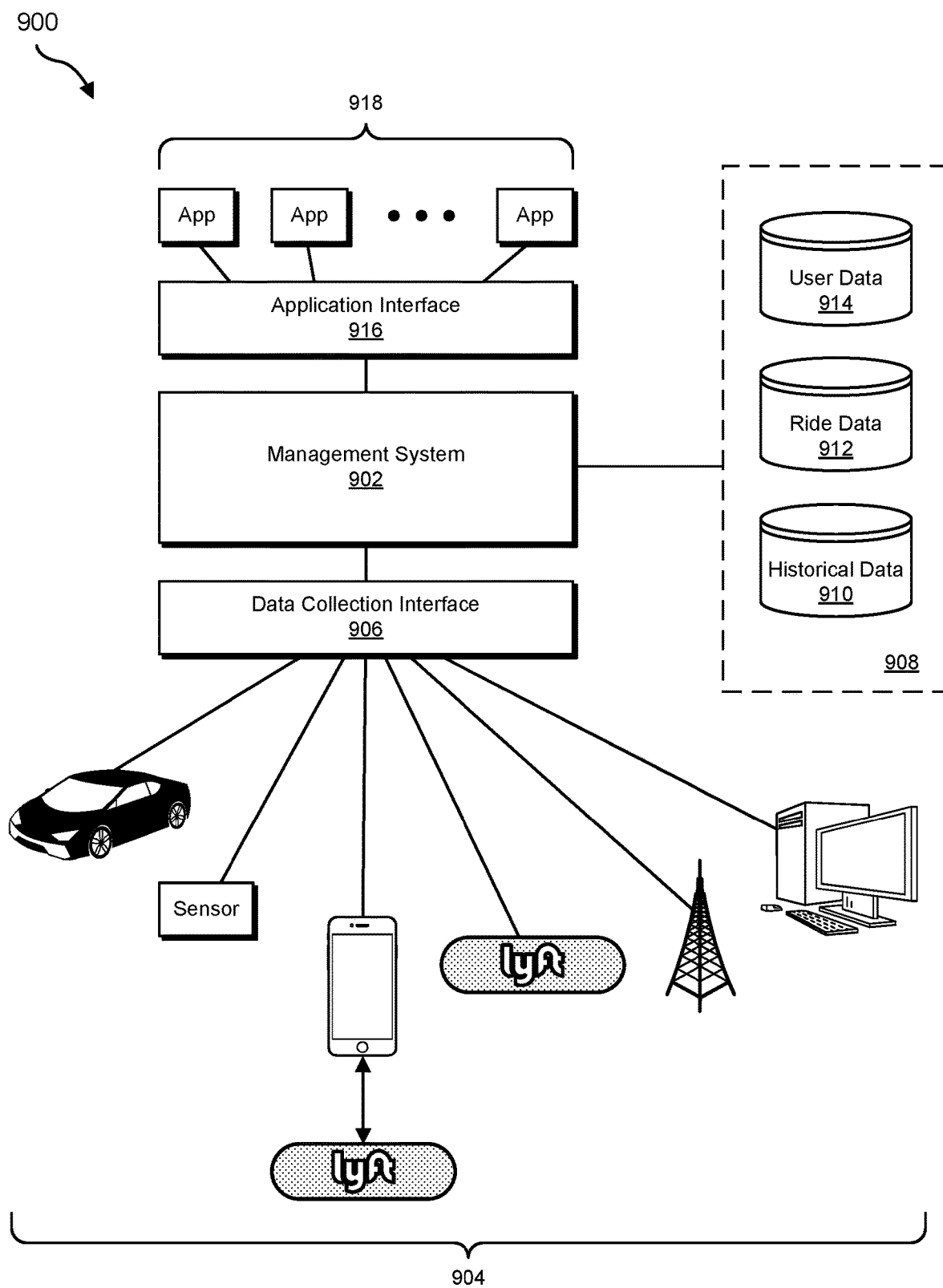
FIG. 9 is an illustration of an example data collection and application management system.

FIG. 9 shows a data collection and application management environment 900, in accordance with various embodiments. As shown in FIG. 9, management system 902 may be configured to collect data from various data collection devices 904 through a data collection interface 906. As discussed above, management system 902 may include one or more computers and/or servers or any combination thereof. Data collection devices 904 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 906 can include, e.g., an extensible device framework configured to support interfaces for each data collection device. In various embodiments, data collection interface 906 may be extended to support new data collection devices as they are released and/or to update existing interfaces to support changes to existing data collection devices. In various embodiments, data collection devices may communicate with data collection interface 906 over one or more networks. The networks may include any network or communication protocol as would be recognized by one of ordinary skill in the art, including those networks discussed above.

As shown in FIG. 9, data received from data collection devices 904 can be stored in data store 908. Data store 908 may include one or more data stores, such as databases, object storage systems and services, cloud-based storage services, and other data stores. For example, various data stores may be implemented on a non-transitory storage medium accessible to management system 902, such as historical data store 910, ride data store 912, and user data store 914. Data stores 908 can be local to management system 902, or remote and accessible over a network, such as those networks discussed above or a storage-area network or other networked storage system. In various embodiments, historical data 910 may include historical traffic data, weather data, request data, road condition data, or any other data for a given region or regions received from various data collection devices. Ride data 912 may include route data, request data, timing data, and other ride related data, in aggregate and/or by requestor or provider. User data 914 may include user account data, preferences, location history, and other user-specific data. Although certain data stores are shown by way of example, any data collected and/or stored according to the various embodiments described herein may be stored in data stores 908.

As shown in FIG. 9, an application interface 916 can be provided by management system 902 to enable various apps 918 to access data and/or services available through management system 902. Apps 918 may run on various user devices (including provider and requestor computing devices, such as those discussed above) and/or may include cloud-based or other distributed apps configured to run across various devices (e.g., computers, servers, or combinations thereof). Apps 918 may include, e.g., aggregation and/or reporting apps which may utilize data 908 to provide various services (e.g., third-party ride request and management apps). In various embodiments, application interface 916 can include an API and/or SPI enabling third party development of apps 918. In some embodiments, application interface 916 may include a web interface, enabling web-based access to data 908 and/or services provided by management system 902. In various embodiments, apps 918 may run on devices configured to communicate with application interface 916 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (e.g., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, by a transportation requestor device, progress information that indicates progress of a transportation provider toward a request location;
   presenting, via a graphical user interface associated with the transportation requestor device, the progress of the transportation provider toward the request location with a graphical representation of the transportation provider according to the progress information;
   receiving, by the transportation requestor device, contextual information from a server that explains the progress of the transportation provider; and
   changing, via the graphical user interface of the transportation requestor device, the graphical representation of the transportation provider to a graphical representation of the contextual information that represents a time period during which the progress information was not received by the server from the transportation provider, wherein the graphical representation of the contextual information comprises a second, different graphical representation that represents an estimated current position of the transportation provider derived from the contextual information, the second, different graphical representation being presented simultaneously with the graphical representation of the transportation provider.

2. The computer-implemented method of claim 1, wherein the contextual information explains a diminished progress of the transportation provider.

3. The computer-implemented method of claim 1, wherein the graphical representation of the transportation provider is a first icon displayed within the graphical user interface of the transportation requestor device; and
   the graphical representation of the contextual information is a second icon displayed within the graphical user interface of the transportation requestor device, wherein the first icon is different from the second icon.

4. The computer-implemented method of claim 1, wherein the graphical representation of the contextual information is displayed within the graphical user interface of the transportation requestor device as an icon representing a vehicle with illuminated brake lights.

5. The computer-implemented method of claim 1, wherein the contextual information comprises traffic congestion near the transportation provider.

6. The computer-implemented method of claim 1, wherein the graphical representation of the contextual information is displayed within the graphical user interface of the transportation requestor device when a speed of the transportation provider is less than a threshold.

7. The computer-implemented method of claim 1, wherein the server is configured to:

receive the progress information from the transportation provider over a communication link on a periodic basis; and determine when the progress information is not being received by the server, wherein changing the graphical representation of the transportation provider to the graphical representation of the contextual information is performed in response to determining that the progress information is not being received by the server.

8. The computer-implemented method of claim 7, wherein, when the progress information is not received by the server, the graphical representation of the contextual information comprises an animation of an expected progress of the transportation provider toward the request location.

9. The computer-implemented method of claim 8, wherein changing the graphical representation of the transportation provider to the graphical representation of the contextual information comprises altering the graphical representation of the transportation provider.

10. The computer-implemented method of claim 9, wherein:
the contextual information is based on traffic conditions of roads associated with a route between the transportation provider and the request location.

11. The computer-implemented method of claim 7, wherein determining that the progress information is not received by the server is based on the progress information not being received for a period of time that exceeds a threshold.

12. A system comprising one or more physical processors and one or more memories coupled to one or more of the physical processors, the one or more memories comprising instructions operable when executed by the one or more physical processors to cause the system to perform operations comprising:
receiving, by a transportation requestor device, progress information that indicates progress of a transportation provider toward a request location;
presenting, via a graphical user interface of the transportation requestor device, the progress of the transportation provider toward the request location with a graphical representation of the transportation provider according to the progress information;
receiving, by the transportation requestor device, contextual information from a server that explains the progress of the transportation provider; and
changing, via the graphical user interface of the transportation requestor device, the graphical representation of the transportation provider with a graphical representation of the contextual information that represents a time period during which the progress information was not received by the server from the transportation provider, wherein the graphical representation of the contextual information comprises a second, different graphical representation that represents an estimated current position of the transportation provider derived from the contextual information, the second, different graphical representation being presented simultaneously with the graphical representation of the transportation provider.

13. The system of claim 12, wherein the contextual information explains a diminished progress of the transportation provider.

14. The system of claim 12, wherein the graphical representation of the transportation provider is a first icon displayed within the graphical user interface of the transportation requestor device; and
the graphical representation of the contextual information is a second icon displayed within the graphical user interface of the transportation requestor device, wherein the first icon is different from the second icon.

15. The system of claim 12, wherein the graphical representation of the contextual information is displayed within the graphical user interface of the transportation requestor device as an icon representing a vehicle with illuminated brake lights.

16. The system of claim 12, wherein the contextual information comprises traffic congestion near the transportation provider.

17. The system of claim 12, wherein the graphical representation of the contextual information is displayed within the graphical user interface of the transportation requestor device when a speed of the transportation provider is less than a threshold.

18. The system of claim 12, wherein the server is configured to:
receive the progress information from the transportation provider over a communication link on a periodic basis; and
determine when the progress information is not being received by the server, wherein changing the graphical representation of the transportation provider to the graphical representation of the contextual information is performed in response to determining that the progress information is not being received by the server.

19. The system of claim 18, wherein, when the progress information is not received by the server, the graphical representation of the contextual information comprises an animation of an expected progress of the transportation provider toward the request location.

20. A non-transitory computer-readable storage medium comprising computer-readable instructions that, when executed by at least one processor of a computing device, cause the computing device to:
receive, by a transportation requestor device, progress information that indicates progress of a transportation provider toward a request location;
present, via a graphical user interface of the transportation requestor device, the progress of the transportation provider toward the request location with a graphical representation of the transportation provider according to the progress information;
receive, by the transportation requestor device, contextual information from a server that explains the progress of the transportation provider; and
change, via the graphical user interface of the transportation requestor device, the graphical representation of the transportation provider with a graphical representation of the contextual information that represents a time period during which the progress information was not received by the server from the transportation provider, wherein the graphical representation of the contextual information comprises a second, different graphical representation that represents an estimated current position of the transportation provider derived from the contextual information, the second, different graphical representation being presented simultaneously with the graphical representation of the transportation provider.

* * * * *